United States Patent [19]

Simeri et al.

[11] Patent Number: 4,505,509
[45] Date of Patent: Mar. 19, 1985

[54] REMOVABLE VAN BENCH

[75] Inventors: Albert R. Simeri; Paul S. Simeri, both of Elkhart, Ind.

[73] Assignee: Van Express, Inc., Elkhart, Ind.

[21] Appl. No.: 502,327

[22] Filed: Jun. 8, 1983

[51] Int. Cl.³ .............................................. B60P 3/32
[52] U.S. Cl. ..................................... 296/63; 297/232; 296/183; 296/156
[58] Field of Search ..................... 296/63, 65, 69, 156, 296/181, 183, 198; 297/232, 14, 15

[56] References Cited

U.S. PATENT DOCUMENTS

| | | | |
|---|---|---|---|
| 3,105,716 | 10/1963 | Learmont | 296/181 |
| 3,246,347 | 4/1966 | Mason | 296/69 |
| 3,880,458 | 4/1975 | Jackson | 296/37.6 |
| 3,944,283 | 4/1976 | Molzon | 296/63 |
| 4,003,596 | 1/1977 | Robertson | 296/69 |
| 4,200,329 | 4/1980 | Inami | 296/69 |

Primary Examiner—Robert R. Song
Attorney, Agent, or Firm—Thomas J. Dodd

[57] ABSTRACT

A van having a belt rail attached to the interior of its side walls for the securement of the rear seat supports thereto. The rear seat of the van is removable along with the floor covering to allow usage of the van for cargo-carrying purposes.

2 Claims, 6 Drawing Figures

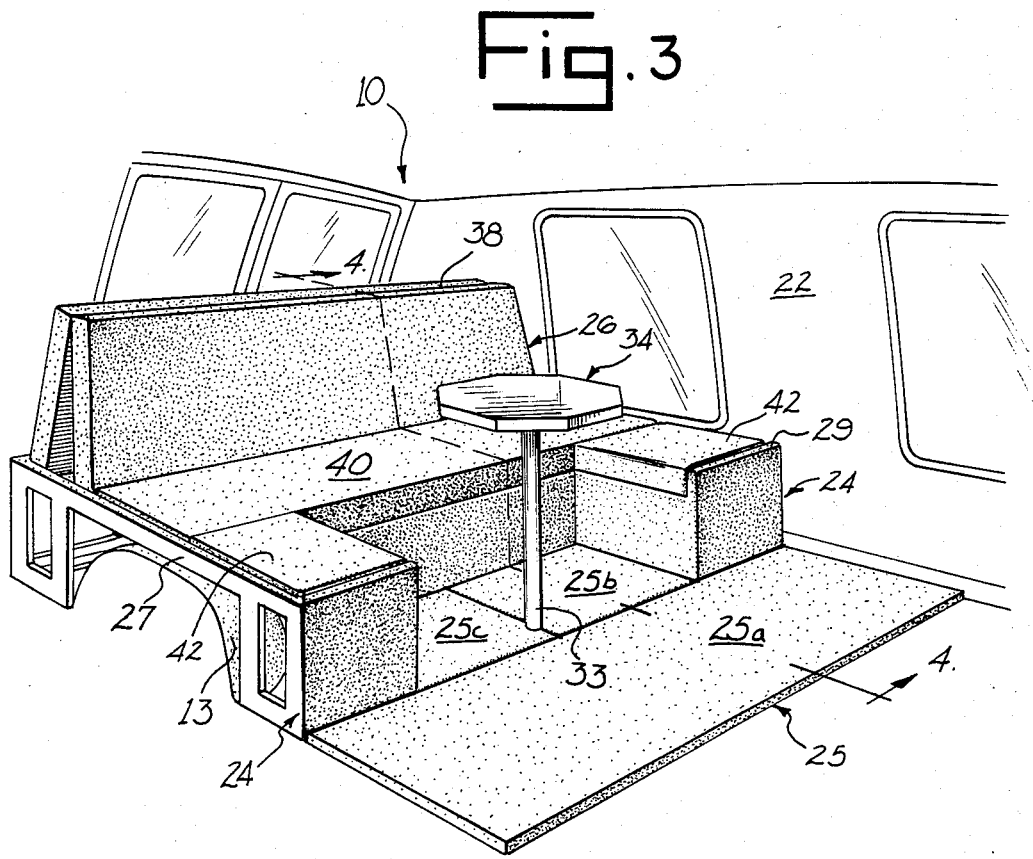
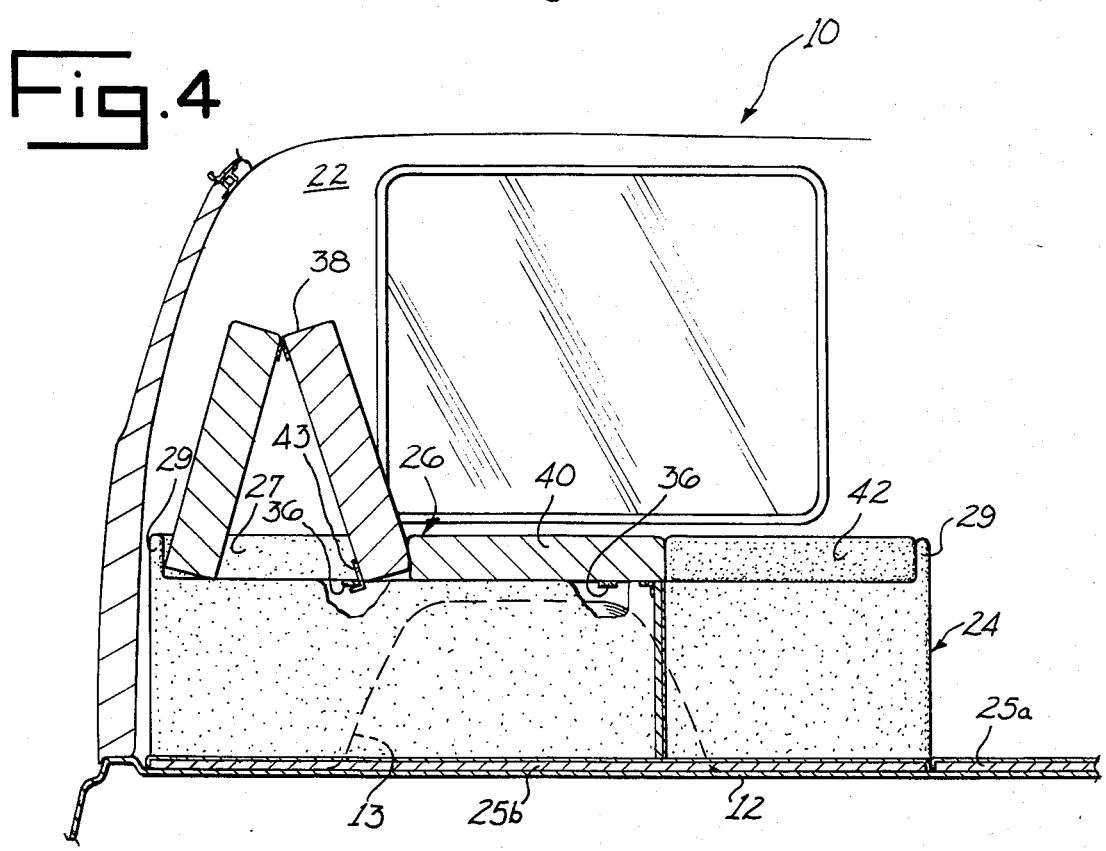

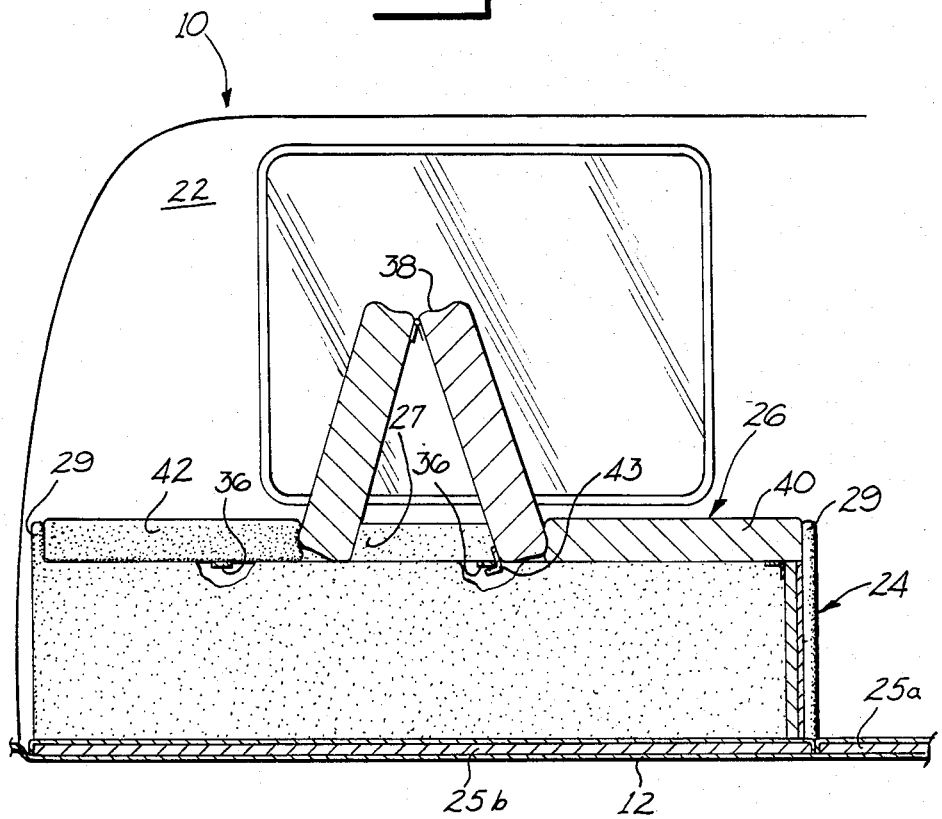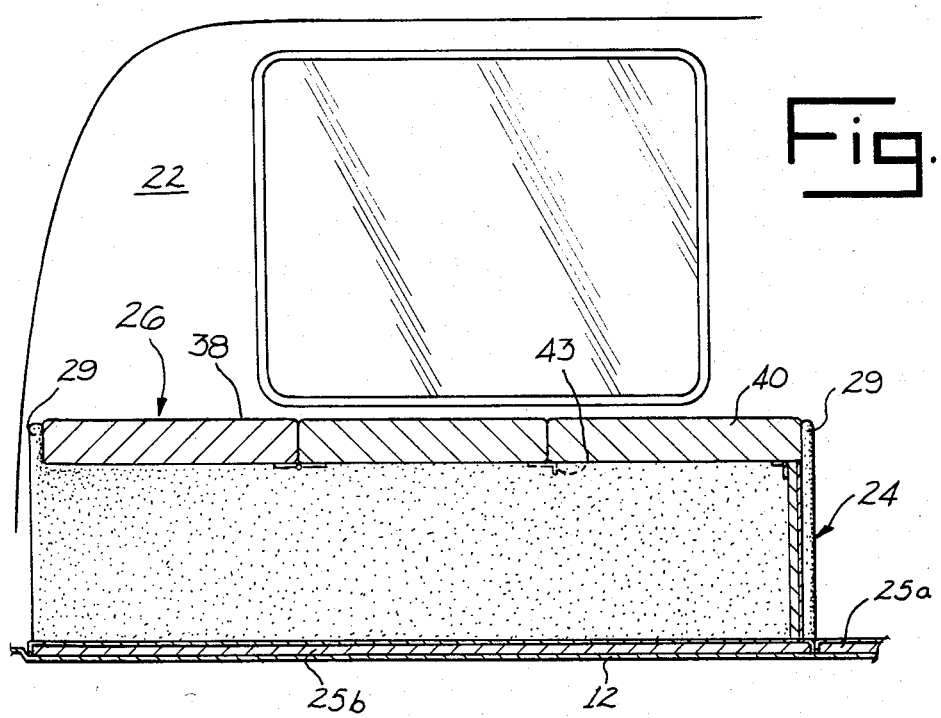

REMOVABLE VAN BENCH

SUMMARY OF THE INVENTION

This invention relates to a van having a versatile rear seat assembly which is secured to the frame of the van.

The van includes inner and outer side walls which are reinforced with ribs which extend between the floor and roof of the van. A horizontal belt rail extending longitudinally between the side walls is secured to the ribs. A seat support is secured to the belt rail. The floor of the van is covered with a panel divided into sections which may be removed from the van to allow use of the van for carrying cargo.

Accordingly, it is an object of this invention to provide a belt rail for a van interior for securing interior trim and a seat support thereto.

Another object is to provide a floor covering for a van divided into removable sections to permit use of the van for carrying cargo.

Other objects of this invention will become apparent upon a reading of the following description.

BRIEF DESCRIPTION OF THE DRAWINGS

FIG. 3 is a perspective view of the interior of the van showing the seating installed.

FIG. 4 is a sectional view taken along line 4—4 of FIG. 3 with portions broken away for illustration.

FIG. 5 is a sectional view similar to FIG. 4 showing a second seat configuration and having portions broken away for illustration.

FIG. 6 is a sectional view similar to FIG. 4 showing a third seat configuration.

DESCRIPTION OF THE PREFERRED EMBODIMENT

Figure 1:
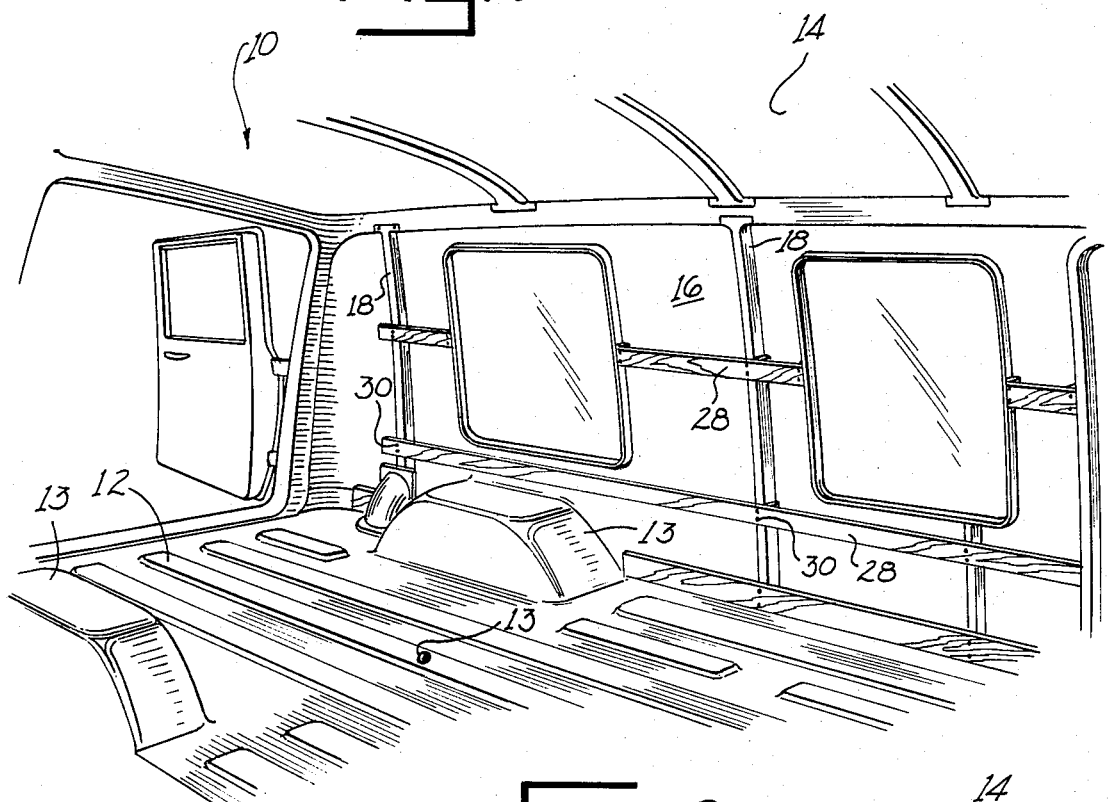
FIG. 1 is a perspective view of the interior of a van showing the seating removed.

The preferred embodiment illustrated is not intended to be exhaustive or to limit the invention to the precise form disclosed. It is chosen and described in order to explain the principles of the invention and its application and practical use to thereby enable others skilled in the art to utilize the invention.

The subject matter of this invention is intended to be applied to the interior of a van 10 which includes a floor 12 having wheel wells 13 formed therein, a roof 14, and outer side walls 16. Ribs 18 extend vertically between floor 12 and roof 14 and give rigid support to walls 16. An inner wall 22 is applied over ribs 18. Generally, insulation 20 is placed between walls 16 and 22. A floor covering 25 is provided to overlie floor 12. Seat supports 24 are located over wheel wells 13 and support a seat assembly 26.

Figure 2:
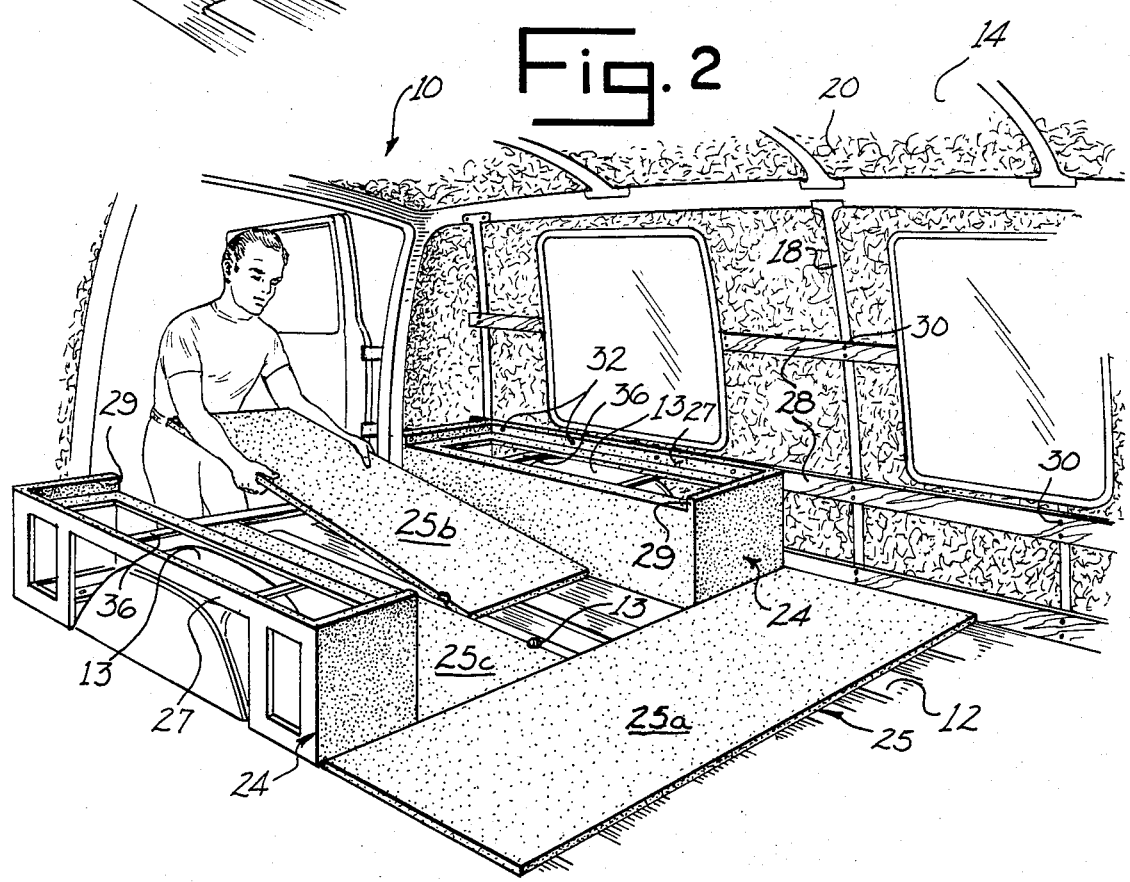
FIG. 2 is a perspective view of the interior of the van showing the seating and the floor covering being installed.

In this invention, belt rails 28 are secured to ribs 18, as shown in FIGS. 1 and 2 with fasteners 30, such as screws. Belt rails 28 provide points for attachment of inner wall 22. Each seat support 24 is generally box-shaped and has an inner side rail 27 which is secured to the lower belt rail 28 on each wall 16 with fasteners 32, such as screws. Fasteners (not shown), such as screws, are used to secure each seat support 24 to floor 12. Securement of seat supports 24 to belt rails 28 and floor 12 provides for rigidity of the seat supports.

Floor covering 25 of this invention includes three panels 25a, 25b, 25c which may be removed from van 10, as shown in FIG. 2, to allow use of van 10 for carrying cargo. Panels 25b, 25c have aligning semicircular indentations found in their facing edges which form a circular opening in alignment with a recess 13 in floor 12 which receives the lower end of a table post 33 for supporting a table 34 as shown in FIG. 3.

Seat supports 24 have upwardly projecting end edges 29 and laterally extending straps 36 which position and retain seat 26 upon the supports. Seat 26 includes a folding back rest section 38, a seat section 40, and two seat sections 42 which may be positioned upon seat supports 24 to create a variety of seating configurations, as shown in FIGS. 3-6. Seat backrest section 38 includes hooks 43 which interlock with either of straps 36 in two seating configurations, shown in FIGS. 4 and 5, to prevent collapse of the backrest section as a person relaxes against it. In one configuration, shown in FIG. 6, backrest section 38 folds out flat and with seat section 40 provides a sleeping area. Seat sections 42 and table 34 are removed. The construction and interfit of seat 26 and seat supports 24 are such that the seat may be removed when floor covering 25 is removed to allow use of van 10 for carrying cargo.

It is to be understood that this invention is not to be limited by the above terms but may be modified within the scope of the appended claims.

What we claim is:

1. In a van including a floor, a covering for said floor, outer side walls, vertical rib means for providing rigid support for the side walls, an inner wall applied over said side walls and said rib means, a seat assembly, the improvement comprising a horizontal belt rail secured to said rib means and located between said side walls and inner walls, and a seat support mounted to said floor and secured to said belt rail, said seat assembly carried upon said seat support.

2. The van of claim 1 wherein said floor covering includes multiple panel sections, each panel section being removable from said floor.

* * * * *